US010245653B2

(12) United States Patent
Suhling

(10) Patent No.: US 10,245,653 B2
(45) Date of Patent: Apr. 2, 2019

(54) MODULAR TUBING NOTCHER SYSTEM

(71) Applicant: Robert James Suhling, Waukegan, IL (US)

(72) Inventor: Robert James Suhling, Waukegan, IL (US)

( * ) Notice: Subject to any disclaimer, the term of this patent is extended or adjusted under 35 U.S.C. 154(b) by 262 days.

(21) Appl. No.: 15/236,340

(22) Filed: Aug. 12, 2016

(65) Prior Publication Data
US 2018/0043439 A1    Feb. 15, 2018

(51) Int. Cl.
| B23B 47/28 | (2006.01) |
|---|---|
| B25B 5/14 | (2006.01) |
| B25B 1/10 | (2006.01) |
| B25B 1/20 | (2006.01) |
| B25B 1/24 | (2006.01) |
| B25B 5/00 | (2006.01) |
| B25B 5/10 | (2006.01) |

(52) U.S. Cl.
CPC ............ *B23B 47/281* (2013.01); *B25B 1/103* (2013.01); *B25B 1/20* (2013.01); *B25B 1/205* (2013.01); *B25B 1/2415* (2013.01); *B25B 1/2463* (2013.01); *B25B 5/003* (2013.01); *B25B 5/006* (2013.01); *B25B 5/103* (2013.01); *B25B 5/147* (2013.01); *B23B 2215/72* (2013.01); *B23B 2247/10* (2013.01); *B23B 2260/03* (2013.01); *B25B 5/102* (2013.01)

(58) Field of Classification Search
USPC ................................... 83/581, 630; 408/103
See application file for complete search history.

(56) References Cited

U.S. PATENT DOCUMENTS

| 2,726,694 | A | * | 12/1955 | Saxton | B25B 5/103 269/218 |
|---|---|---|---|---|---|
| 3,758,221 | A | * | 9/1973 | Meshulam | B23B 51/0473 144/20 |
| 4,123,189 | A | * | 10/1978 | Ferlise | B23B 5/00 408/21 |
| 4,194,422 | A | * | 3/1980 | Williams | B23D 21/02 83/581 |
| 4,562,760 | A | * | 1/1986 | Kinsley | B23D 21/02 83/693 |
| 4,619,447 | A | * | 10/1986 | Blake | B25B 5/103 24/514 |
| 5,016,507 | A | * | 5/1991 | Riera | B23D 21/00 83/319 |
| 5,964,137 | A | * | 10/1999 | Jung | B23D 21/02 83/54 |
| 7,114,423 | B2 | * | 10/2006 | Kelley | B23D 21/02 83/191 |

(Continued)

*Primary Examiner* — Nina Bhat
(74) *Attorney, Agent, or Firm* — Lesley A. Wallerstein, LLC

(57) ABSTRACT

A machining assembly which allows for precise and repeatable machining operations—primarily tube notching—to be carried out by an operator in various situations, and is specifically designed for hollow-form parting without use of a mandrel in prototyping and small-scale production. This system allows operators to cut copes in both typical and atypical materials, and offers the ability to produce double end-coped workpieces quickly. Additionally, the preferred embodiment can be equipped for use as a light-duty milling machine which incorporates portability with the benefits of traditional milling centers.

8 Claims, 15 Drawing Sheets

(56) References Cited

U.S. PATENT DOCUMENTS

| | | | | |
|---|---|---|---|---|
| 7,125,206 B2* | 10/2006 | Turner | ............... | B25H 1/0064 |
| | | | | 408/92 |
| 7,607,870 B2* | 10/2009 | Hughes, Jr. | ........... | B23B 41/003 |
| | | | | 408/103 |
| 8,152,419 B1* | 4/2012 | Snyder | ............... | B23B 47/281 |
| | | | | 408/105 |
| 8,734,066 B2* | 5/2014 | Rusch | ............... | B23B 47/281 |
| | | | | 279/107 |
| 2002/0060489 A1* | 5/2002 | Richard | ............... | B21D 22/04 |
| | | | | 297/391 |
| 2005/0039512 A1* | 2/2005 | Lefevere | ............... | B21D 17/04 |
| | | | | 72/215 |
| 2008/0107490 A1* | 5/2008 | Hughes | ............... | B23B 41/003 |
| | | | | 408/103 |
| 2009/0022559 A1* | 1/2009 | Hughes, Jr. | ............. | B25H 1/00 |
| | | | | 408/103 |
| 2012/0243954 A1* | 9/2012 | Rusch | ............... | B23B 47/281 |
| | | | | 408/103 |
| 2015/0114072 A1* | 4/2015 | Baudy | ............... | B21K 23/00 |
| | | | | 72/370.04 |
| 2016/0339562 A1* | 11/2016 | Myers | ............... | B25B 1/24 |

* cited by examiner

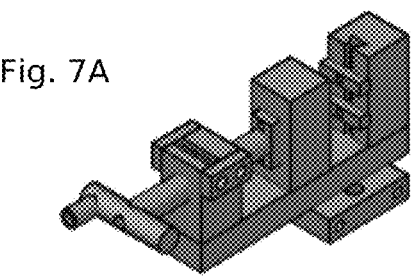
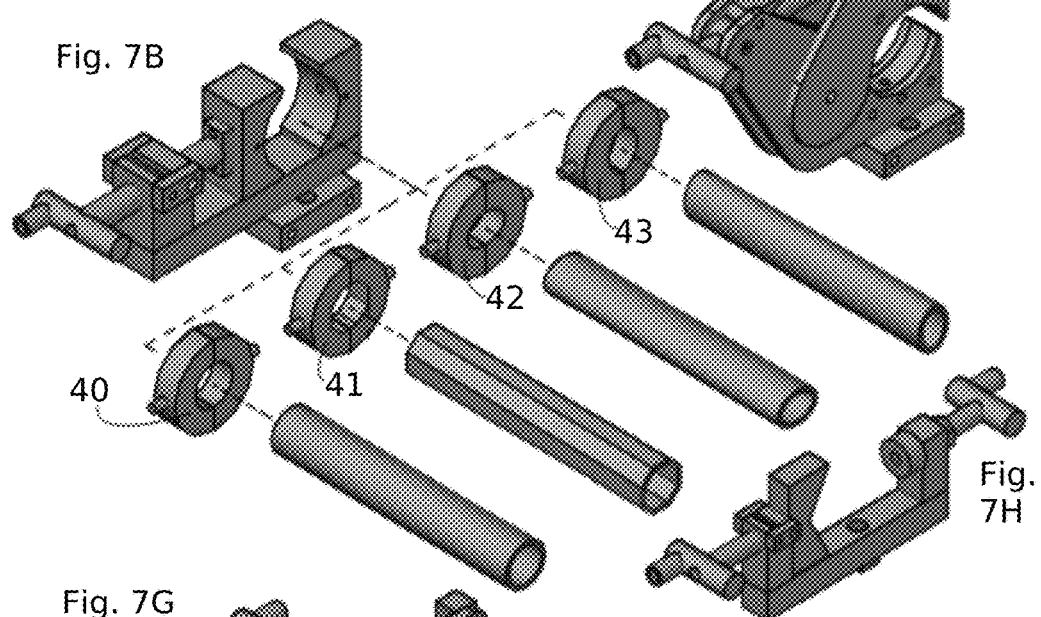
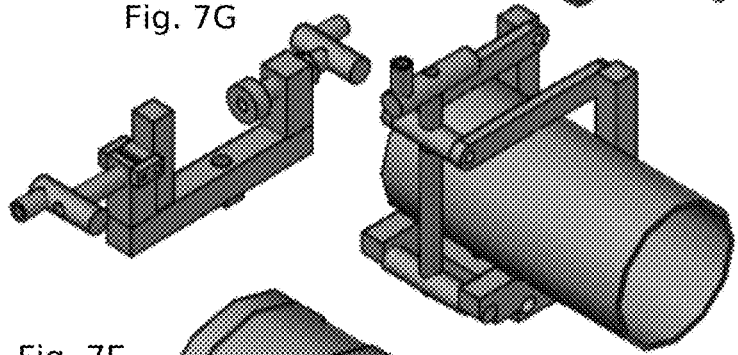
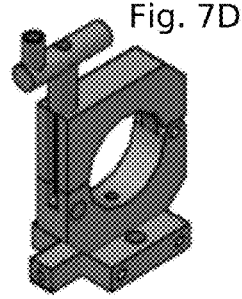
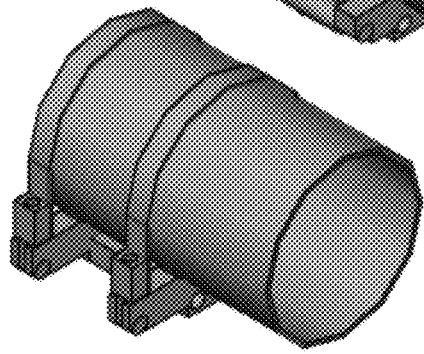

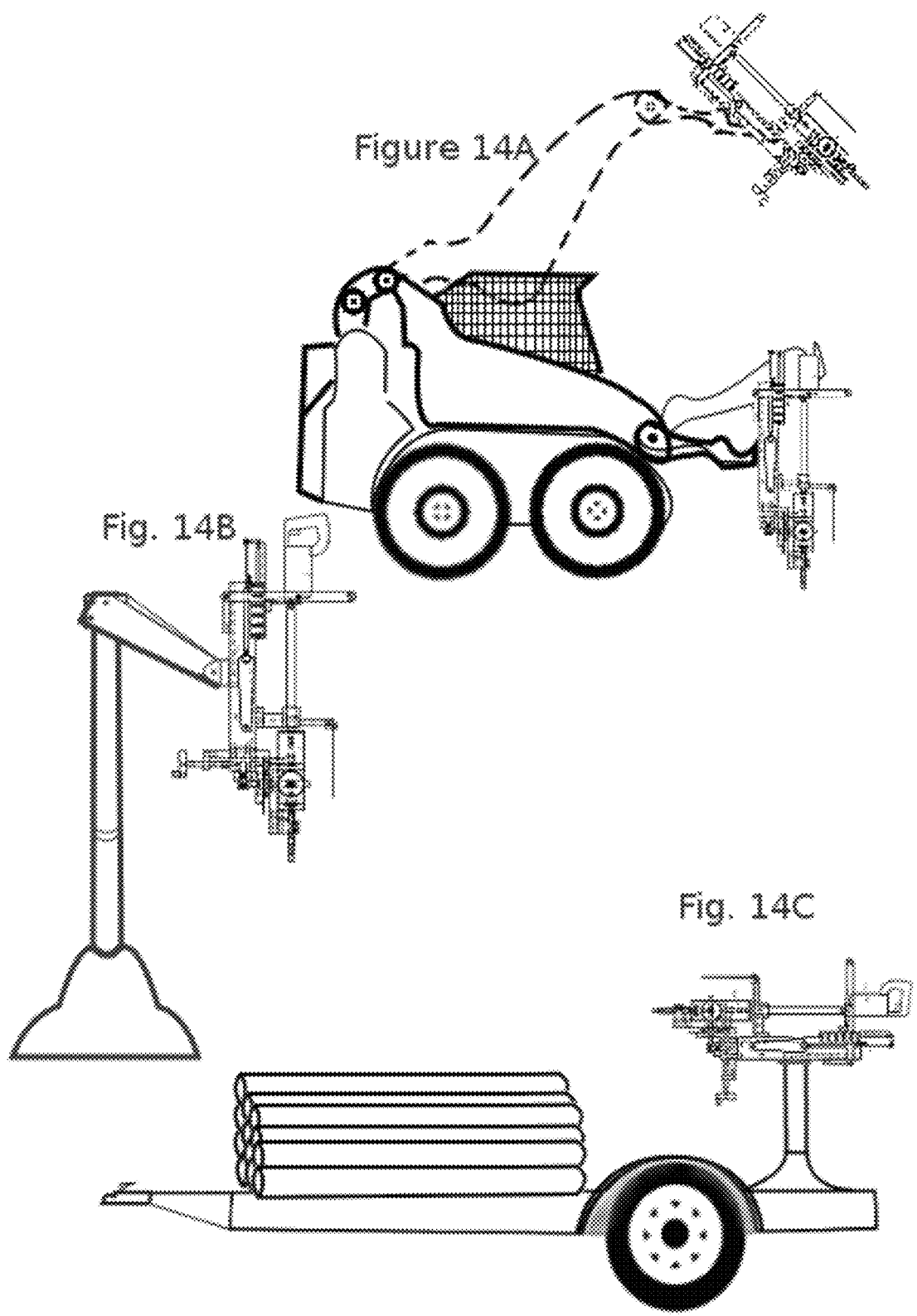

MODULAR TUBING NOTCHER SYSTEM

STATEMENT REGARDING FEDERALLY SPONSORED RESEARCH OR DEVELOPMENT (Not applicable)

NAMES OF PARTIES TO A JOINT RESEARCH AGREEMENT (Not applicable)

REFERENCE TO SEQUENCE LISTING, A TABLE OR A COMPUTER PROGRAM LISTING, COMPACT DISC APPENDIX (Not applicable)

CROSS-REFERENCE TO RELATED APPLICATION (Not applicable)

FIELD OF THE INVENTION

This patent application concerns the state of the art of tools and machines known as "tubing notchers," which are designed to remove a portion of a workpiece by means of pressing or grinding: respectively, punch-style notchers or rotary style cutting and abrading notchers, including such cutting instruments as grinders, milling bits, and hole-saws. The present invention relates to the latter, with a specific focus on hole-saw-style tubing notchers. Tubing notchers and light-duty machining assemblies are used in many fields including but not limited to the agricultural, automotive, construction, entertainment, exhibition, and telecommunication industries.

BACKGROUND OF THE INVENTION

The present invention improves upon the state of the art by streamlining the design of the present invention into a form which incorporates the benefits of a mill and a tubing notcher and simultaneously mitigates the shortfalls of these two machines. In the primary mode of the preferred embodiment, the form in which most cutting operations will take place, the present invention appears and operates much like a horizontal mill: it is able to move a secured workpiece along a planar coordinate system through indexing actions in relation to a relatively static-though axially rotating-cutting instrument. In this system, the workpiece is conveyed along the X-coordinate and the Y-coordinate through clockwise and counter-clockwise rotation of lead-screws, and this conveyance in the X and Y planes alters the location of the workpiece in relation to the orthogonal Z-coordinate of the cutting instrument's cutting path. The preferred embodiment of the present invention (FIG. 1) is equipped with a close-quarters vise, a cutoff support vise, a work-stop, protective shielding, an electric drill motor, a leveling floor stand, and a hole-saw as a cutting instrument.

This system may be equipped with alternative cutting and shaping instruments, including annular cutters, drill bits, milling bits, reamers, taps, rasps, abrading bits, and other rotary cutting and shaping instruments. In addition to tooling and vise options, the present invention is designed to allow an operator to implement accessories and modifications as he or she sees fit, including such additions as work-stops, workpiece supports, lubrication and coolant supply lines, vise inserts, additional protective shielding, support extensions, and other customized accommodations. Even without modification, the preferred embodiment of the present invention in FIG. 1 is suited for typical notching operations.

Unlike milling machines, some contemporary tubing notchers may operate without the need of a floor stand, instead clamping directly to the material to be machined. If this operation is necessary—perhaps the workpiece is a cemented post, underground pipe, or other material that cannot be removed for one reason or another—the preferred embodiment may be operated in a second mode, where the workpiece acts as the stationary point of reference while the present invention is attached to it. After the notcher assembly is securely clamped to the workpiece, an operator can manipulate the machine in order to precisely remove material at a specific angle of cut. In this sense, the present invention may be used on jobs at which both milling machines and self-contained tubing notchers excel.

When utilizing tubing notchers, operators must often cut notches in tubes at specific angles to produce tight fitting joinery. Without proper tube notching equipment, notching operations may be imprecise, unreproducible, unsightly, and potentially dangerous; even with specialized vises, many systems are not both safe and efficient for the professional operator.

There are options within the state of the art to address these problems: expensive and complex-though multipurpose-milling machines, or economical and simplistic-though specialized-tubing notchers. Even so, these options present some problems. Firstly, while milling machines are precise and can address many typical cutting demands when properly equipped, they are often prohibitively massive, expensive, difficult to implement and operate, and still may not address all cutting needs when dealing with workpieces of odd size, shape, or structure.

Secondly, contemporary tubing notchers with vise systems allow for relatively safe and precise tube cutting, but do not address specialized cutting demands-such as on workpieces that are already bent, have irregularly shaped profiles, are comprised of a strange material, or are otherwise atypical. Operators within the industry would greatly benefit from a system that combines ease-of-implementation with precision, while being applicable to almost any workpiece.

The present invention improves upon the state of the art by introducing an abrading or cutting-style tubing notcher system to be used for nearly any operation within the art. This design expands upon contemporary cutting-style notchers by incorporating the pros of milling machines while mitigating disadvantages: a mill's mass, immobility, difficulty-of-implementation, and specialized operator training. Unlike most tubing notchers within the state-of-the-art, the preferred embodiment can make multiple passes through various, measured, cutting locations along a workpiece without removing it from the clamping apparatus. Due to its modular nature, the present invention may be implemented in various alternative embodiments-including changes in tooling, hardware, vises, and various accessories-to accommodate nearly all operational requirements.

Additionally, the preferred embodiment of the present invention includes multiple modes of operation, addressing the procedural shortfalls of most notchers and milling machines, so that operators can complete light-duty machining and notching tasks, as well as several non-traditional actions including piercing, broaching, routing, planing, stropping, buffing, and even simply providing workpiece support while other actions are accomplished. What's more, unlike many systems within the state of the art, the present invention can be used in series, thereby allowing one or more operators the ability to shape workpieces in ways that a contemporary notcher cannot.

The current embodiment of the present invention is uniquely suited to producing a production run of machined tubes with end-notches on both tube ends, and an operator thus engaged would begin by equipping the machine with the proper vise and any additional accessories he or she might need. For such a task, the operator may also implement a tubular work-stop and a workpiece cut-off support vise (please see FIG. 2). If the vises are not already situated, the operator would secure the desired main vise at the proper angle on the vise base to the infeed side of the cutting instrument, the support vise and work-stop to the outfeed side, then would clamp the material in the proper vise. After securing the material and verifying the cutting angle, the operator can manipulate the X-coordinate and Y-coordinate handles to bring the workpiece into the correct cutting coordinate to notch the end of the tube.

When the cutting coordinate is properly set, the operator can energize the drive motor and push the feed handle to extend the cutting instrument through the cutting path before retracting the feed handle and ceasing rotation of the cutting instrument. For a second set of steps, the operator can loosen the vise, push the material flush to the cylindrical work-stop, re-tighten the vise, manipulate the X/Y-coordinate handles to bring the workpiece into the correct cutting path (according to the required cut length) and again energize and cycle the cutting instrument. After two such cutting operations, the operator will have produced a solitary double-notched tube; if the operator repeats the second set of steps, a single additional cutting operation will produce another double-notched tube. This second set of steps may be repeated until the length of material is exhausted.

The present invention improves upon the state-of-the-art in the following ways. The workpiece retention module of the preferred embodiment includes a variable-vise system, which lets operators use the most useful vise and vise inserts for a given task. Having the ability to accommodate unforeseen requirements, such as issues of workpiece size, shape, material, finish, and clamping profile, gives operators the ability to use the preferred embodiment in situations where contemporary tubing notchers wouldn't function. In an extreme example-of-use, once properly equipped, an operator of the preferred embodiment could quickly, repeatably, and safely process elliptical carbon-fiber tubes for producing racing bicycles; after changing vises and cutting instruments, this same machine can drill beveled bungholes in wine barrels.

Many of the vises within the suggested alternative embodiments keep a relative workpiece "zero." That is, with proper inserts (as in FIG. 7) or by using self-centering vises, an operator can alternate vises without needing to refer to offset charts to reestablish a relative zero between vises.

Operators can control rotation in two planes: the X-axis and the Y-axis, relative to the Z-axis of the cutting path. To rotate about the Y-axis, Operators can loosen the vise based upon the degree table, rotate the vise base and the vise, and then tighten the vise base back onto the degree table in order to control one axis of the workpiece. Additionally, operators can rotate the workpieces within the jaws of the vise to revolve the workpiece about the X-axis. While not a part of the preferred embodiment, a potential alternative embodiment of the present invention includes a rotatable bearing between the main body and the workpiece conveyance module, allowing for rotation about the Z-axis. These methods of rotational control afford the operator a high degree of control over the cutting angle relative to the workpiece.

The variable-vise system allows operators to hold onto workpieces with specialized clamping surfaces: either directly through a vise or through clamping inserts. This specialized clamping can provide more clamping surface with a narrower clamping profile than traditional vises; using such a vise allows users to clamp closer to the point at which the cutting instrument will pass through the workpiece, resulting in much higher rigidity than is possible from traditional vises. This added rigidity equates to more precise cutting and longer tool life.

The design of the vice allows operators to use a second clamp on the opposite side of the cutting path in order to either catch the cut workpiece or to provide additional rigidity to the cutting operation. The use of a secondary vise (best exemplified in FIGS. 2 and 12, though present in all drawings) can accommodate nonstandard tubing and may be positioned as a lateral work stop. Operators may use these alternate vises much the same way as a second primary vise, especially in tandem clamping operations where more clamping pressure and surface area is needed on a workpiece. Tandem clamping is especially useful during milling operations, while the notcher must attach itself to a stationary workpiece while in the second mode of operation, and when excessive pressure from a single vise may damage a workpiece.

In conjunction with the points above, a puck-like structure connects the rotatable vise base with the non-rotatable X-degree table by fitting within a counter-bored negative space of said X-degree table. In this way, the workpiece retention module is more structurally sound than using a single bolt or pin as a pivot point, the pivot point of the retention module can be centered on the workpiece rather than the parameters of a vise, and the vise may be clamped at any angle relative to the cutting instrument. Though the preferred embodiment uses smooth surface to surface clamping to secure itself, alternative embodiments of the workpiece retention structure may include a rack and pinion method of rotation, or even using another lead screw with a geared X-axis pivot nut to rotate the vise and vise based upon the X-degree table.

The preferred embodiment of the present invention includes a workpiece conveyance module, which allows operators to control the point at which notches are made in a workpiece without removing the workpiece from within the vise system. The preferred embodiment affords precise control over two dimensions of the workpiece—the X and Y dimensions of the machine, and thereby the workpiece-through the rotation of X and Y-lead screws.

While the preferred embodiment includes handles to measurably rotate the X and Y-lead screws and move the workpiece, a viable alternative embodiment of the present invention may utilize computer numerical control motors to present a CNC milling machine with the advantages of the present invention.

The present invention includes a quill module, which allows operators control over the cutting instrument of the preferred embodiment. Like the depth gauge and spindle travel stop of a traditional milling machine, operators can control the depth-of-cut (Z dimension) of the preferred embodiment's operation using an internal threaded stop rod.

The preferred embodiment of the present invention has the drill motor in line with the traversal of the quill module and allows the operator to manipulate the traversal of the quill module (feed rate) through a mechanical advantage at the feed bar. These advantages further bolster the rigidity of the assembly, increasing both precision and tool life.

The quill module uses a shaft support structure in order to add rigidity at the cutting instrument throughout the cutting process. Since support can be moved close to the cutting point, there will be minimal deflection from material strain brought about through pressure.

To be clear, operators have control of a workpiece in three relative spatial dimensions and two rotational axes. While this level of control is often relegated to much more expensive machining centers, this system permits fine notching operations with a high degree of consistency and repeatability to a much larger number of operators than have access to large-scale machining centers.

The modularity of the present invention readily accommodates alternative embodiments with accessories and customization. The design of the present invention not only allows accessories to be attached to the vise system itself or inserted within the support rail in order to move along with the workpiece, but also to be attached elsewhere in order to remain separate from the movement of the workpiece or the quill module. Whether static or dynamic, examples of such accessories include safety shields, lubricant and coolant lines, tooling holders, vise jaw inserts, and alternative cutting instruments, as well as work-stops and workpiece supports.

Operators can elect to use a work support rail 56 as in FIG. 2 in order to properly utilize the dynamic work-stop and cut-off support vise, which fit within the workpiece conveyance system and will thus be able to "follow" the movement of the vise within the workpiece conveyance system. In this way, both the work-stop and the support vise will support a workpiece throughout an operation with multiple cutting procedures. This allows operators to make multiple cuts at various locations along a workpiece without needing to reset the location of the work-stop and the work support before each new cut. However, should an operator require either structure to remain static during vise movement, alternate work-stops and supports independent from the movement of the vise may be used.

As stated above, when used in conjunction with the work-stop, work support, and work support rail, the design of the present invention allows an operator efficient production of double-notched tubes. In a further advantage over the state of the art, this design will work even when the end-notches must be cut at angles or offsets.

Because the vise and the shaft support can be set very close to the cutting agent and workpiece, the design of the present invention cuts down on excessive vibration and tool chatter compared to the state of the art and can therefore extend the operating life of cutting agents, drive motors, and the assembly itself.

The preferred embodiment of the present invention may operate in two modes. The primary mode can operate like a light-duty milling machine, and the secondary mode can operate on those large or permanent workpieces that could not be moved to a traditional milling machine, such as permanent structures or existing infrastructure. Therefore, the preferred embodiment may be implemented in locations and scenarios in which a traditional milling machine or a tubing notcher may be impractical.

The preferred embodiment of the present invention includes a stand mount 47 and leveling stand 36. This stand mount 47 may be an attachment point for alternative mounting structures, including a horizontal mount for vertical drilling operations (as in FIGS. 8B and 14B), or vehicle-based mounting (as in FIGS. 14A and 14C). If so desired, the present invention may also be mounted directly to a heavy-duty bench top, sawhorse, or any surface sturdy enough for both the assembly itself and the workpiece to be machined.

The preferred embodiment of the present invention includes a work stop that may act as a boundary and as a secondary work support. While many objects in the state-of-the-art act as a work, many cannot accommodate offsets and rotation without further calculations. Also, the contact object 110 can be replaced with any surface to properly accommodate the workpiece, so the work stop of the preferred embodiment may include a protrusion that is used as a secondary workpiece support at the outfeed.

The work stop can be adjusted at several points, independently from one another. During use, usually, an operator will set the work stop by moving it in the X-plane, raising or lowering it in the Y-plane, rotating the contact object 110 to fit squarely against the workpiece 50, and then pivoting the contact object 110 into the correct phase for offset tubing, if necessary; however, since the work stop may be adjusted independently at these points, these steps can be accomplished in any order and in fact may be better done in reverse if the workpiece is already clamped in the proper place. In this way, an operator may set up their work stop as precisely as they need and may alter single parameters in order to adjust their work stop as necessary, even from part to part. Many stops within the state-of-the-art attempt to quicken the process of setting a stop by adjusting several parameters with a single adjustment, but in the process, they weaken the structure and make adjustments less incremental, leading to less precision.

Inventions within the state of the art allow operators the use of several different cutting and shaping agents in order to act upon a workpiece; in addition to drills, hole-saws, and those other instruments that are typically used with tubing notchers, the present invention may also be used with tooling that is rarely used in notching operations, such as routing bits, buffing and stropping wheels, fixed and adjustable boring heads, coring bits, taps, reamers, annular cutters, and yet others. Though it falls outside the preferred embodiment and utility of the present invention, the present invention may also be used with pushing and slicing instruments, such as blades, punches, broaches, and dies-though tube notching operations with these pushing and slicing instruments could necessitate some sort of mandrel for tube notching.

The design of the preferred embodiment an electrical drive motor as the provider of rotational force, which can be powered by readily available 110/220-volt electrical sources. Alternative embodiments may implement alternative power sources to rotate the cutting instrument module's shaft: a tractor's power take off (PTO) drive, a belt and pulley system, nature-based turbines, fuel-based engines, hydraulics, pneumatics, or even hand and foot cranks. From hand-powered cranks to fuel-based engines to nature-based turbines, the present invention may be powered by various mechanical, hydraulic, and pneumatic means. Likewise, even when using the preferred electrical drive motor, operators can power the present invention through a generator if no local power is available.

Alternative embodiments of the present invention may include a transmission system for the purpose of changing operating torque and speed, and may include gearing or clutching, to protect the operator and the workpiece during certain operations.

Several of the preferred embodiment of the present invention may be implemented in series for large jobs or when several operations must be done to a single workpiece but operating a single machine would be untenable. The nature of the present invention is that it can be static or dynamic, so even if the workpiece is fitted for operation in the primary mode (that is, with the stand still attached) the machine can move and the cutting path can be altered relative to the static workpiece. Note that there is no effective limit to the number of notchers that may be used in a series, and these machines may be placed as near to one another as the profile of the assembly will allow.

BRIEF DESCRIPTION OF THE SEVERAL VIEWS OF THE DRAWINGS

FIG. 7A-H shows several of the vise types and inserts that may be used by operators depending on the required operation and material to be machined. This includes a specialized vise for square tubing 7A, several options for rounded tubing 7B, 7C, 7D, options for oversized clamping 7E, 7F and options for vises that can allow operators to alter the center line of the workpiece relative to the assembly 7G and 7H. Though not a comprehensive representation, FIG. 7B also shows several vise inserts, including a cylindrical reducer 40, a hexagonal reducer 41, a horizontally elliptical reducer 42, and a vertically elliptical reducer 43.

Operators may utilize these or other vises and inserts to accommodate those workpieces needing special clamping requirements. The pictured inserts have stabilizing pins, but the pins may be removed in order to allow the reducers to be rotated within the vise.

Figure 8A:
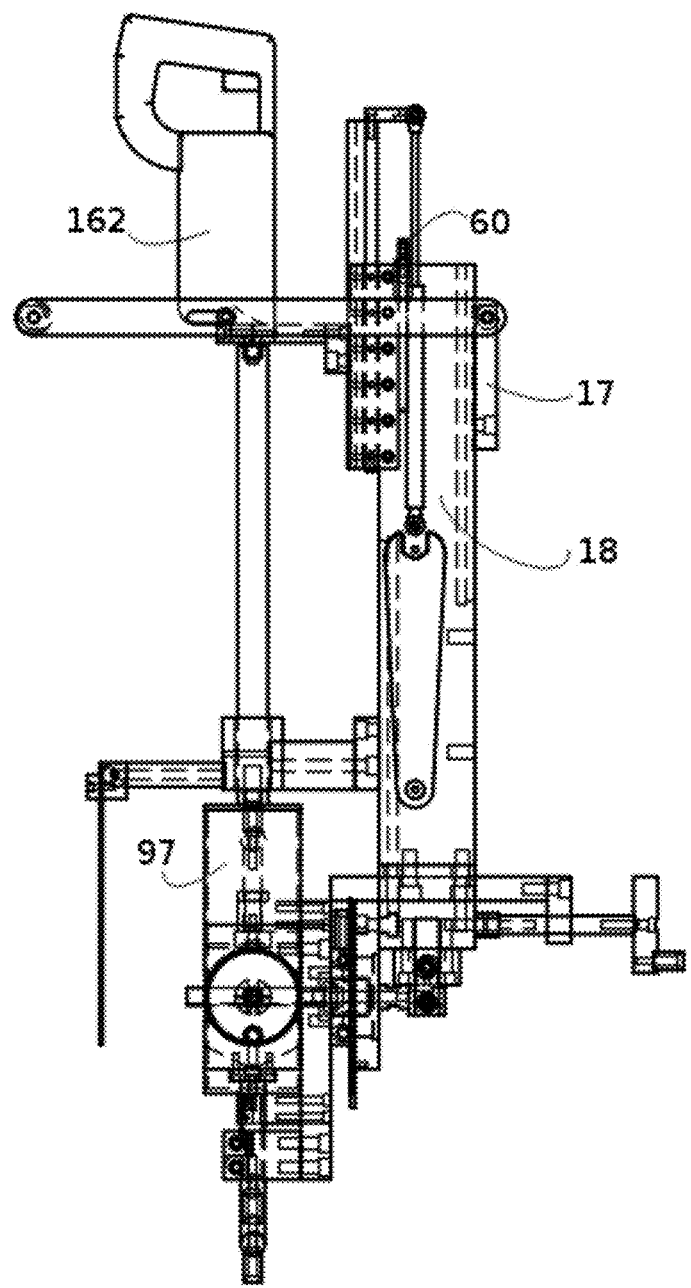
Figure 8B:
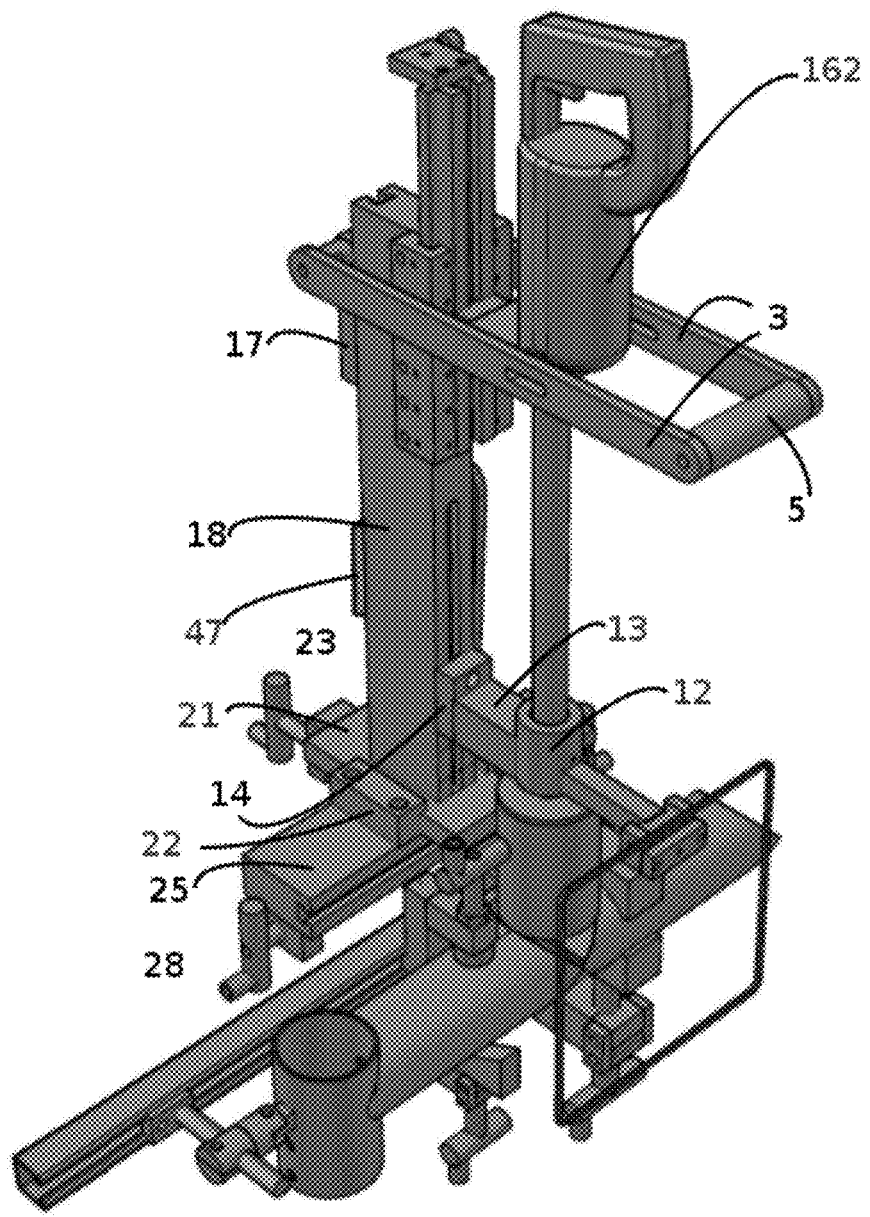

FIG. 8A is a vertical wire frame view of the preferred embodiment to show the internals of the assembly. FIG. 8B is an alternate vertical view and shows how the present invention may be oriented upon a workpiece akin to a traditional drill press assembly; as seen in FIG. 14B, structures would allow the present invention to function in such a form.

Figure 1:
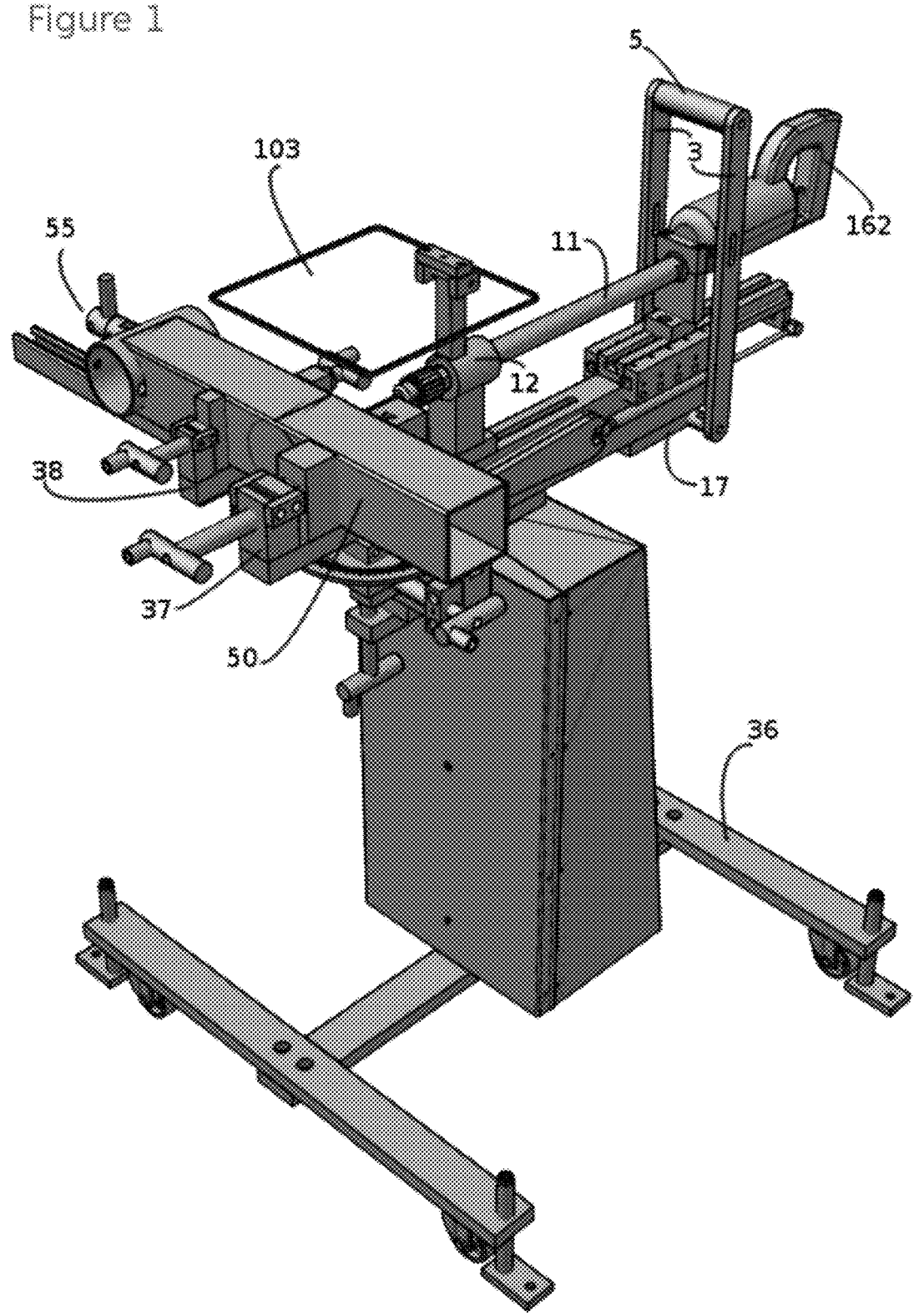
FIG. 1 is an overhead isometric view (top-front-right perspective) of the preferred embodiment of the present invention, equipped with a drill chuck as a cutting instrument 97 and a rectangular workpiece 50 abutted against a work-stop 55 and secured within a primary vise 37 and a secondary vise 38. This view of the preferred embodiment shows a leveling stand 36 with a storage compartment for tooling and other accessories as well as protective shielding 103 that may be used during operation.
Figure 9:
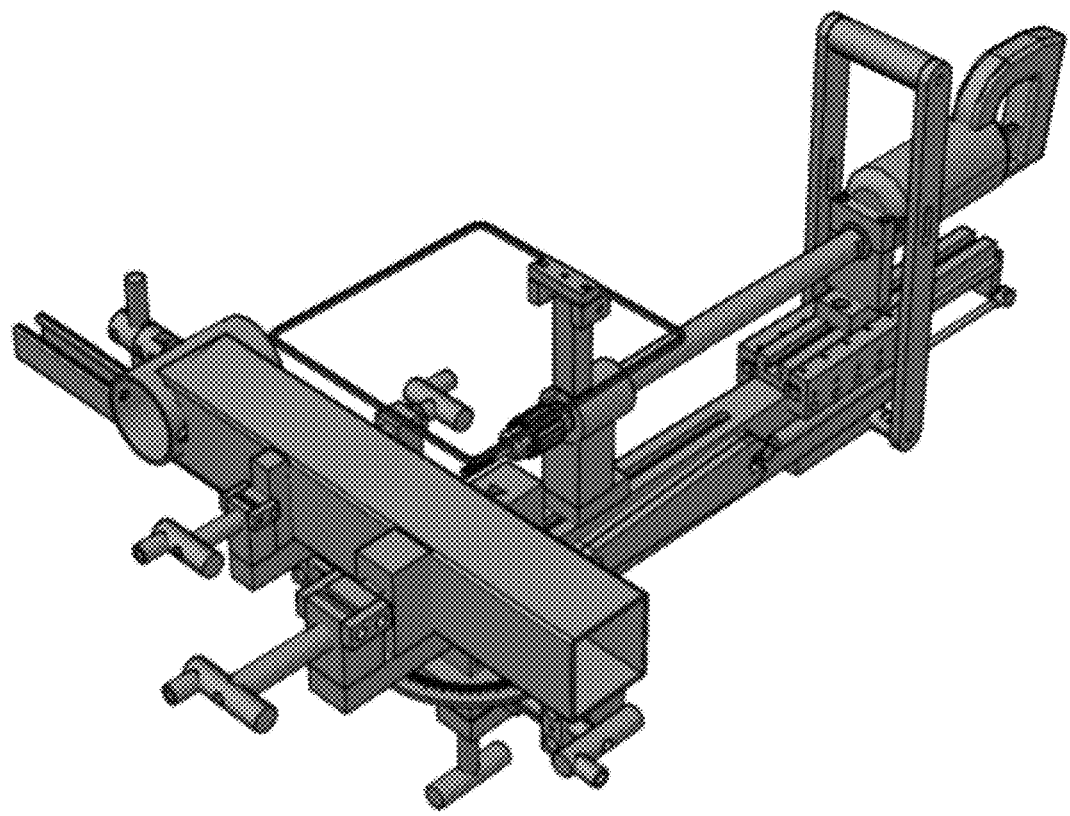

FIG. 9 again shows the quill module in an isometric view as in FIG. 1 but does so without the leveling stand 36 in what may be referred to as the secondary mode of operation, where the assembly would support itself through clamping pressure upon a stationary workpiece.

Figure 10:
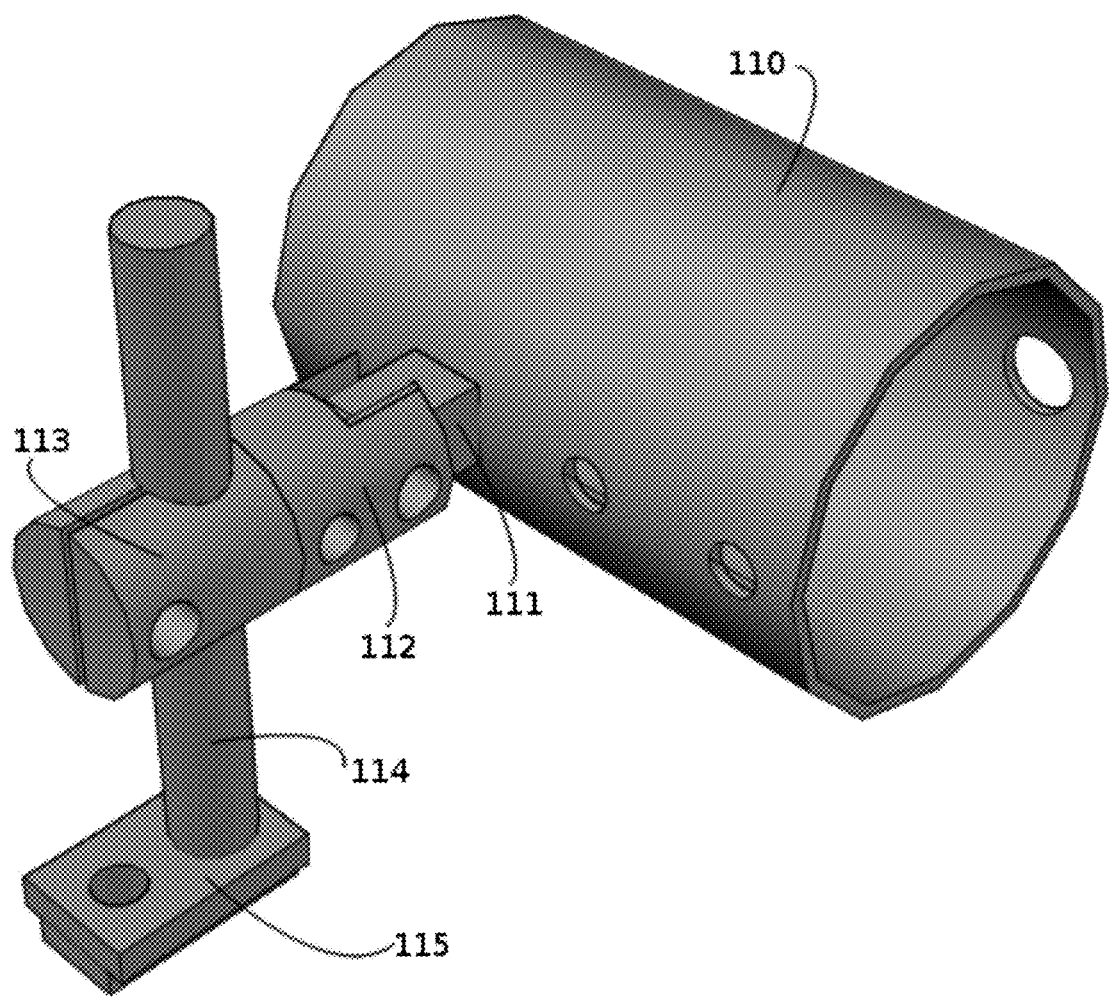

FIG. 10 shows the work stop 55 of the preferred embodiment of the present invention, outfitted with a tubular contact object 110, contact object receiver, 111 a rotating housing 112, post clamp 113, post 114, and rail mount 115.

Figure 11:
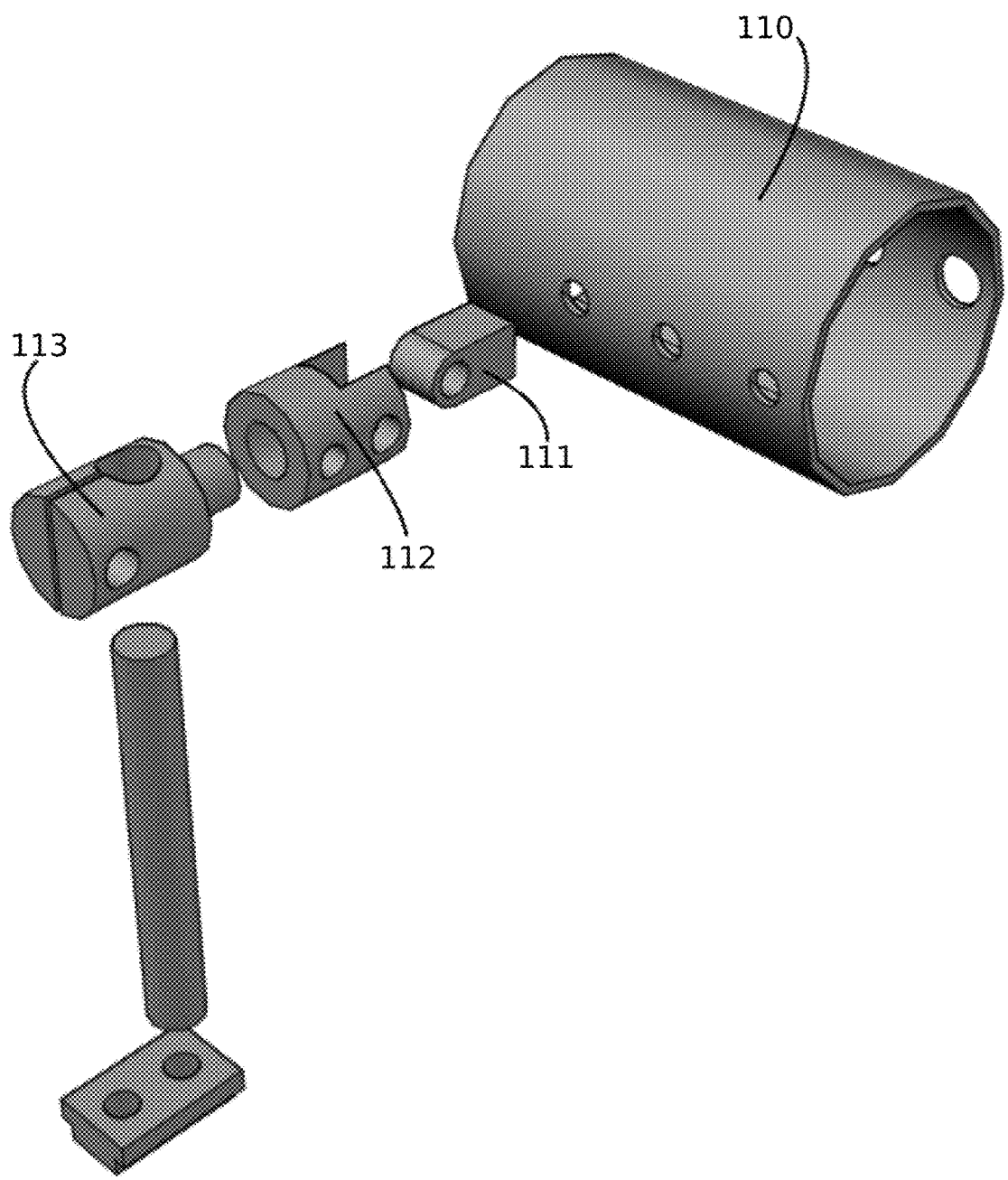

FIG. 11 shows an exploded view of the work stop 55 of the preferred embodiment of the present invention, and the separate adjustment points are more clearly differentiated than in FIG. 10.

Figure 12:
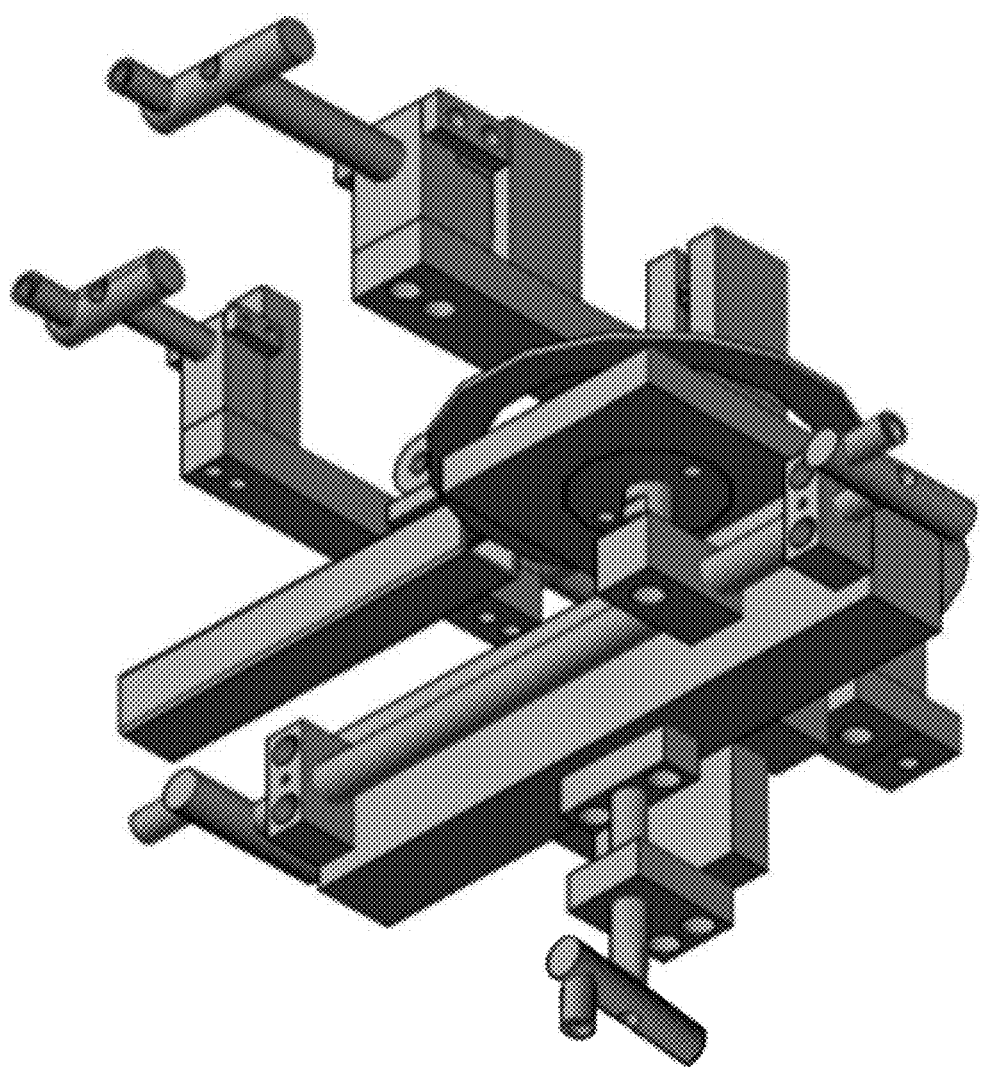

FIG. 12 is another view of the workpiece conveyance module, this time without a workpiece, so the interaction of the primary vise 37 and secondary vise 38 with the rest of the workpiece retention module and the workpiece conveyance module is more clearly visible.

Figure 13:
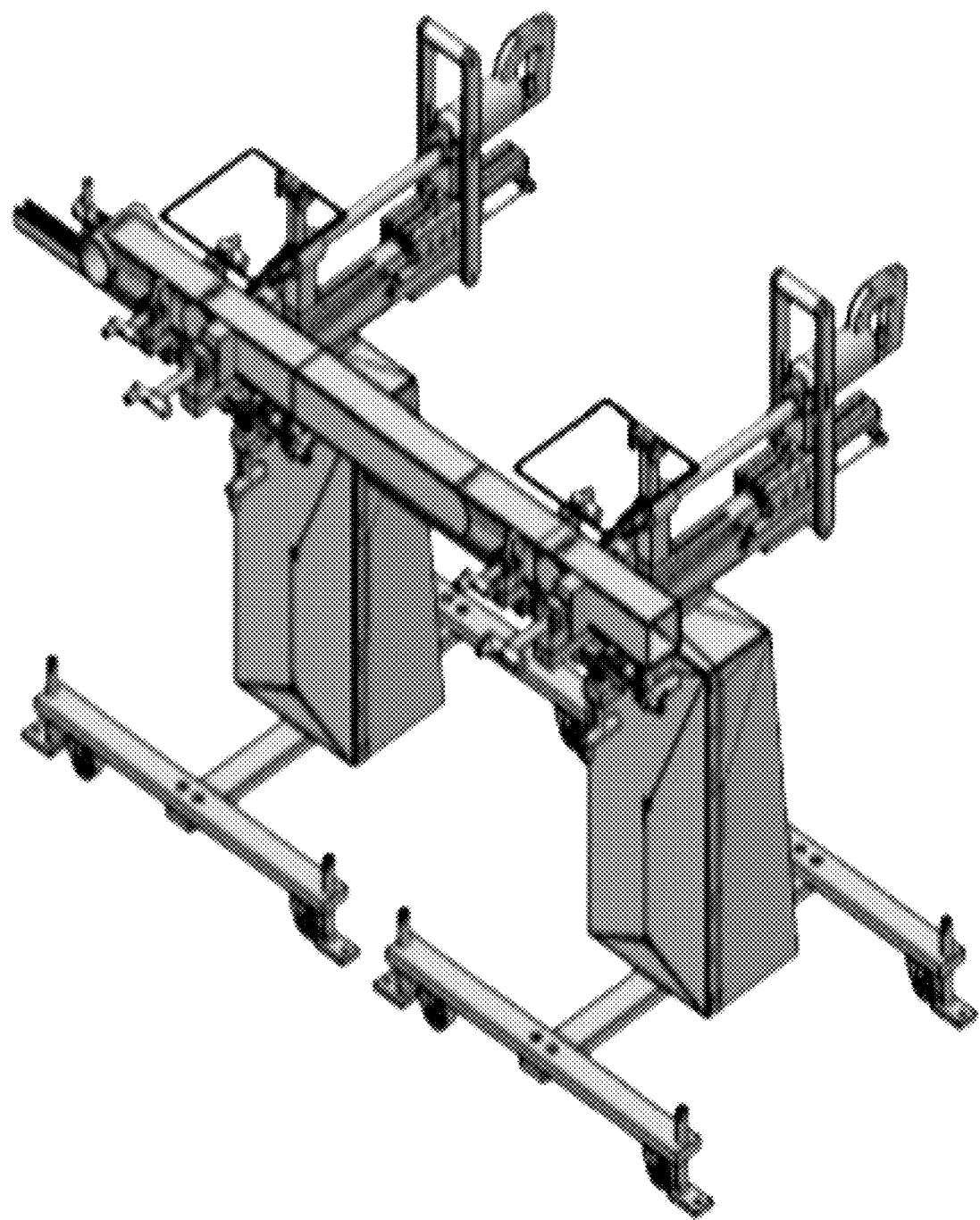

FIG. 13 shows an alternative embodiment of the present invention, with two tube notching assemblies placed in series. Though the FIG. shows such serialization with two assemblies on one side of the workpiece, assemblies may be placed on either side of the workpiece. Note that while there is no practical limit to the amount of assemblies usable in a given operation, some workpiece conveyance modules may need to be altered if the operator(s) cannot adjust the conveyance modules on all assemblies at the same time.

FIG. 14A-14C show alternative mounting options when the traditional leveling stand isn't optimal. As shown, the present invention may be mounted on stationary, mobile, or dynamic structures, including posts, trailers, and boom mounts, respectively, though the present invention may be mounted to nearly any surface. As seen in FIG. 14A, the present invention may be fitted with different drive motors and may be powered through hydraulic, pneumatic, gas-powered, electric, or mechanical means, depending on operational needs.

REFERENCE NUMERALS

Workpiece Retention Module:
34 X-Degree Table
35 Vise Base
37 Primary Vise
38 Support Vise
40-46 Vise Inserts
50 Workpiece
56 Support Rail
60 Workpiece
101 Degree Ring
Workpiece Conveyance Module:
15 T-nuts
21 Y-riser 23 Y-Pillow Block
25 X-body
26 Y-body
27 Y-Lead Screw
28 Lead Screw
30 X-Lead Screw
31 X-nut
Quill Module:
1 Drive Motor Clamp Base
2 Drive Motor Clamp
3 Feed Bars
5 Feed Handle
6 Slide Block
Slide Guides
11 Shaft
12 Shaft Guide
13 Shaft Guide Spacer
14 Shaft Guide Mount
17 Feed Adjuster
18 Main Body
36 Leveling Stand
47 Stand Mount
60 Threaded Stop Rod
97 Cutting Instrument
103 Protective Shielding
162 Drive Motor In reference to FIG. 1, the preferred embodiment of the present invention-referred to as a tubing notcher, assembly, or machine-is comprised of three main areas of operation: the workpiece retention module, the workpiece conveyance module, and the quill or cutting instrument module. The main body 18 acts as the intermediary between the workpiece modules and the quill module. In the primary mode of operation, a stand mount 47 is attached to the underside of the main body 18 which itself attaches to a stand 36 which rests securely upon the ground.

Figure 2:
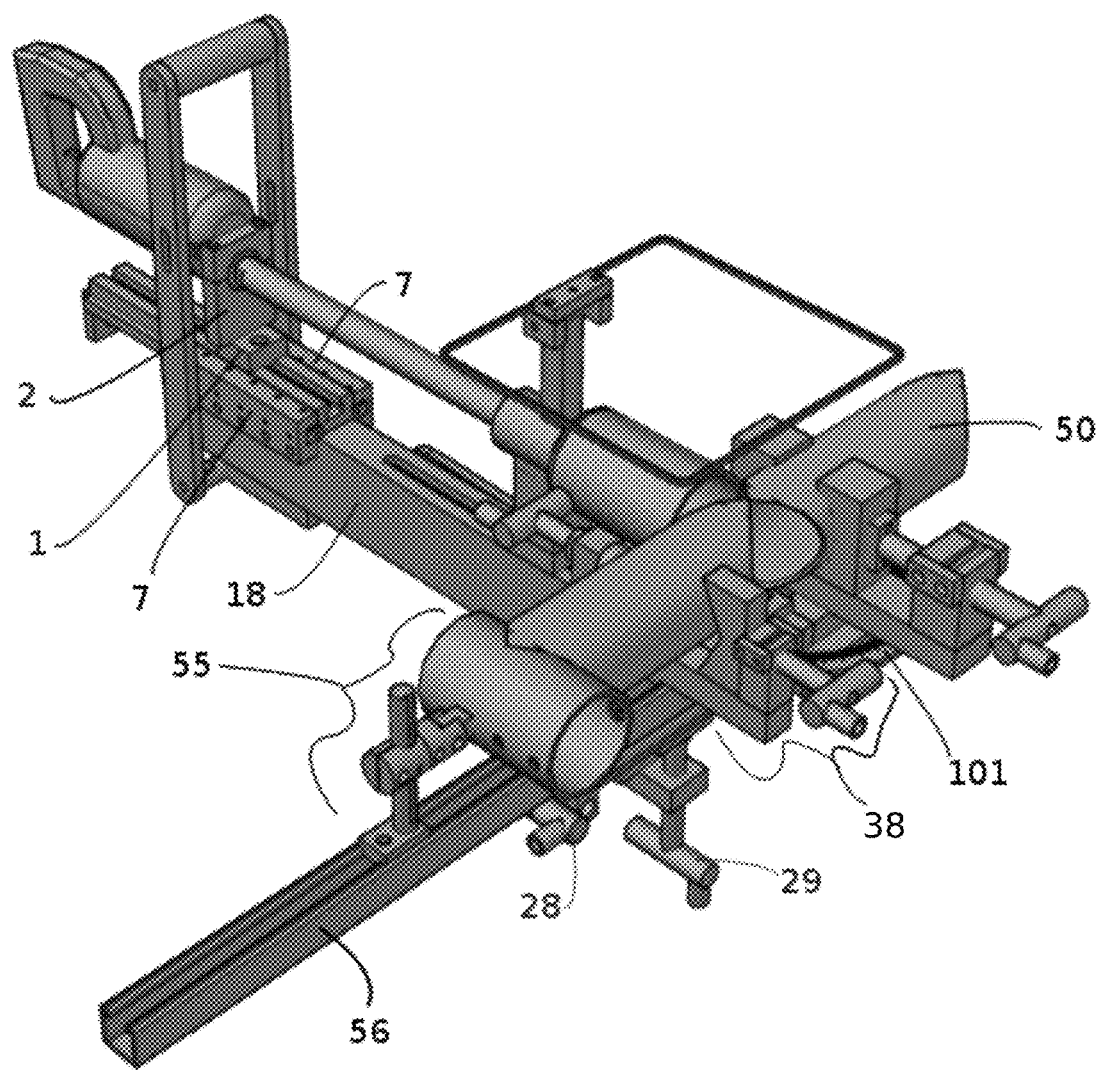
FIG. 2 is an opposite isometric view of the preferred embodiment of the present invention, angled 90° from FIG. 1 to better show the work-stop 55, the cutoff support vise 38, and the extension of the support rail 56.

Reference is now made to FIGS. 1 and 2 to explain the workpiece retention module of the preferred embodiment of the present invention. In this module, a workpiece 50 is held within a system-compatible primary vise 37 that is attached to the vise base 35, which is itself attached to the X-degree table 34 through a clamping action of the X-Axis Pivot Nut 33. The X-nut 31 is intersected through a tapped aperture by the X-lead screw 30 of the workpiece conveyance module.

If an operator wishes to alter the angle of the cutting path upon the workpiece 50, he or she may loosen the vise base 35 from the degree table 34 by loosening the clamping force between the X-degree table 34 and the X-Axis Pivot Nut 33, thereby allowing for rotation of the workpiece 50, vise 37, and vise base 35 about the Y-axis relative to the X-coordinate of the X-lead screw 30 and the Z-coordinate of the main body 18 and the cutting path of the cutting instrument 97.

Figure 3:
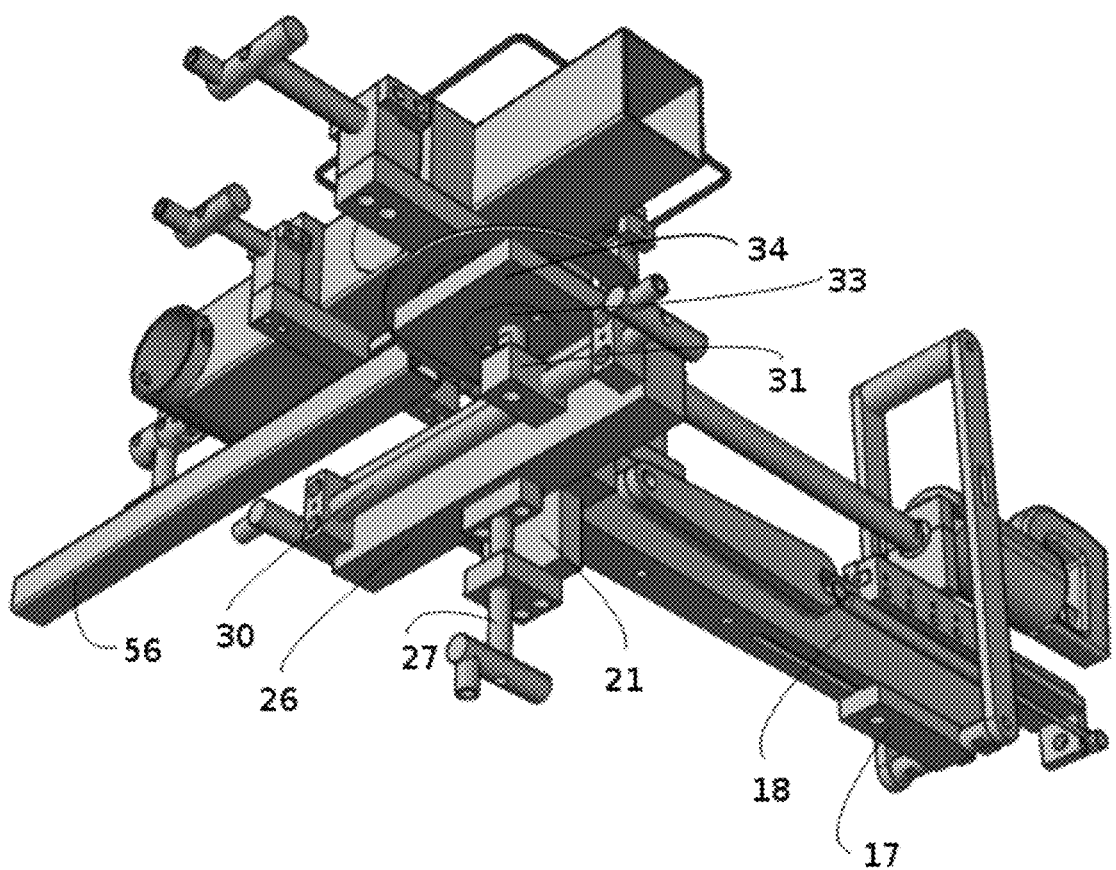
FIG. 3 is an isometric view from below, opposite FIG. 1, to more clearly show the workpiece conveyance assembly: the main body 18 of the cutting instrument module, the X-body 25 and the Y-body 26 of the workpiece conveyance module, and the vise base 35 of the workpiece retention module.
Figure 4:
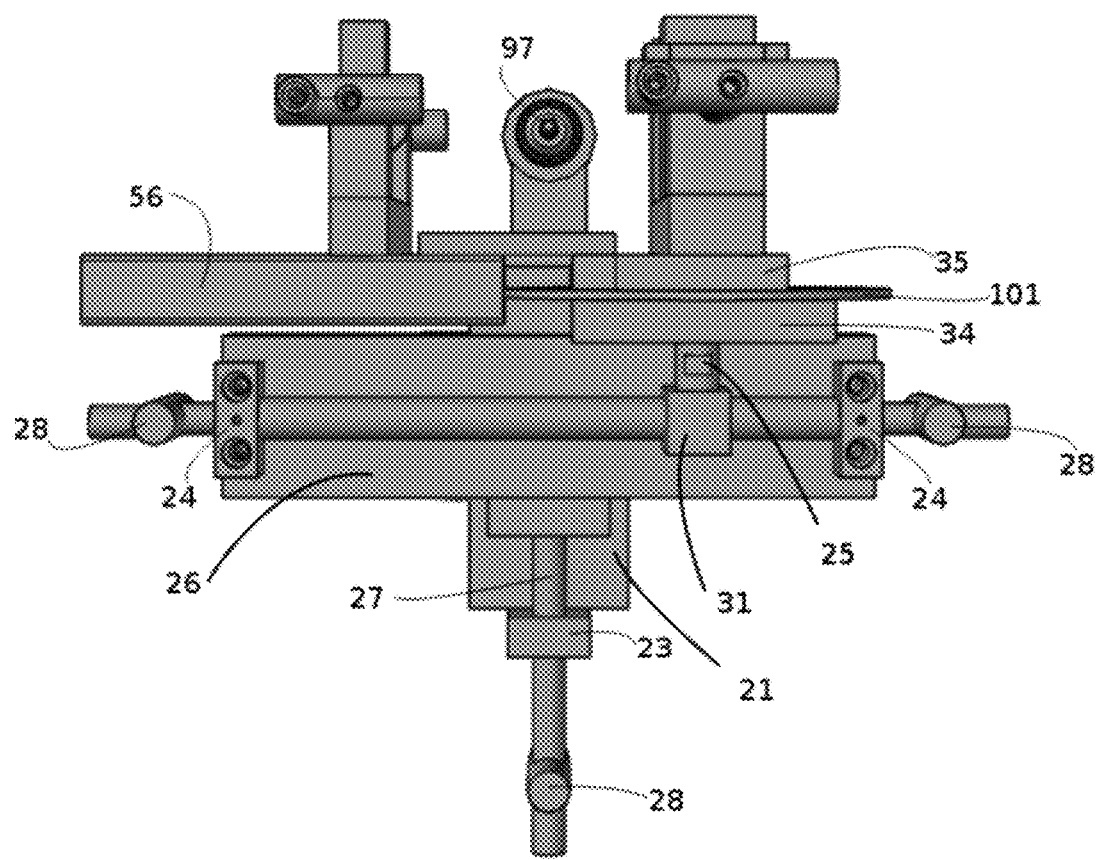
FIG. 4 is a frontal view to show the interaction of the X-lead screw 30 and the Y-lead screw 27 and how the actuation of these lead screws will move the vise 37 and support vise 38 in a direction orthogonal to the cutting instrument 97.
Figure 5A:
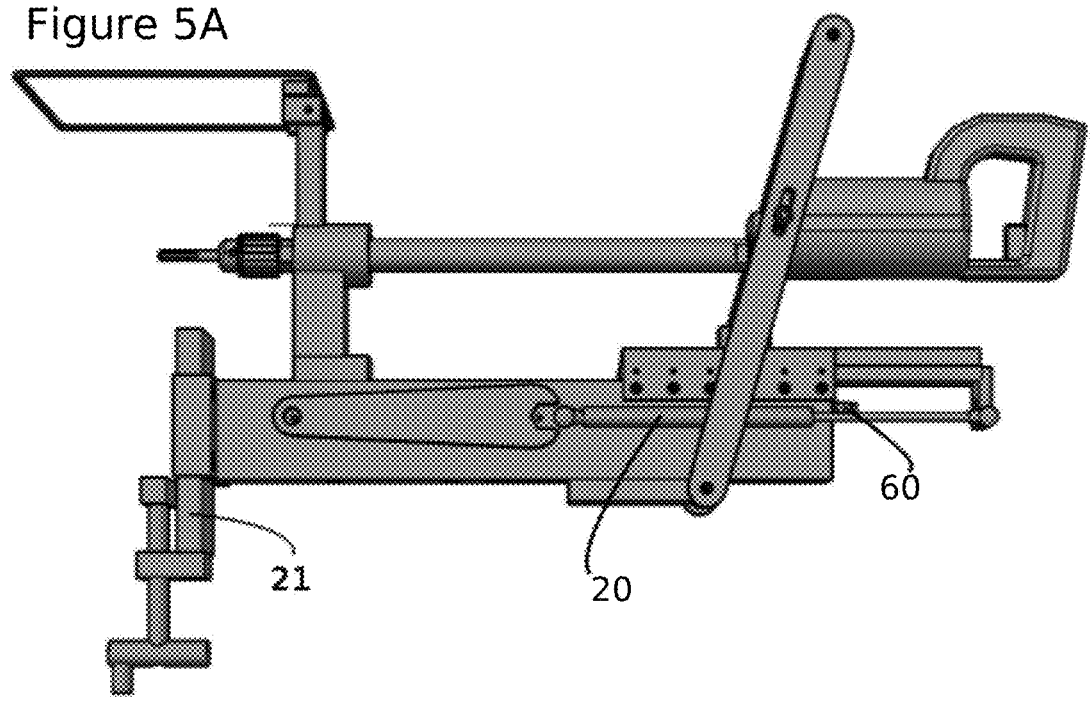
FIGS. 5A and 5B show a sidelong view of the quill module in two stages of operation, with FIG. 5A representing the assembly in the fully retracted position and 5B being a representation of the assembly in an active, cutting position. A cutting cycle is accomplished by moving the feed handle 5 forward and backward in order to exert pressure from the feed bars 3 and move the shaft 11 through the cutting path. The fulcrum of the feed bars 3, the feed adjuster 17, can be moved closer to or farther from a workpiece 50 upon the main body 18, thereby providing the correct amount of travel and force for intended operations. This view also best shows the use of the feed return dampener 20 and the threaded stop rod 60; the return dampener 20 is especially useful for vertical machining operations where gravity would result in dangerous false-feeding, and the threaded stop rod 60 works in all orientations to limit the Z-dimension travel of the cutting instrument 97.
Figure 5B:
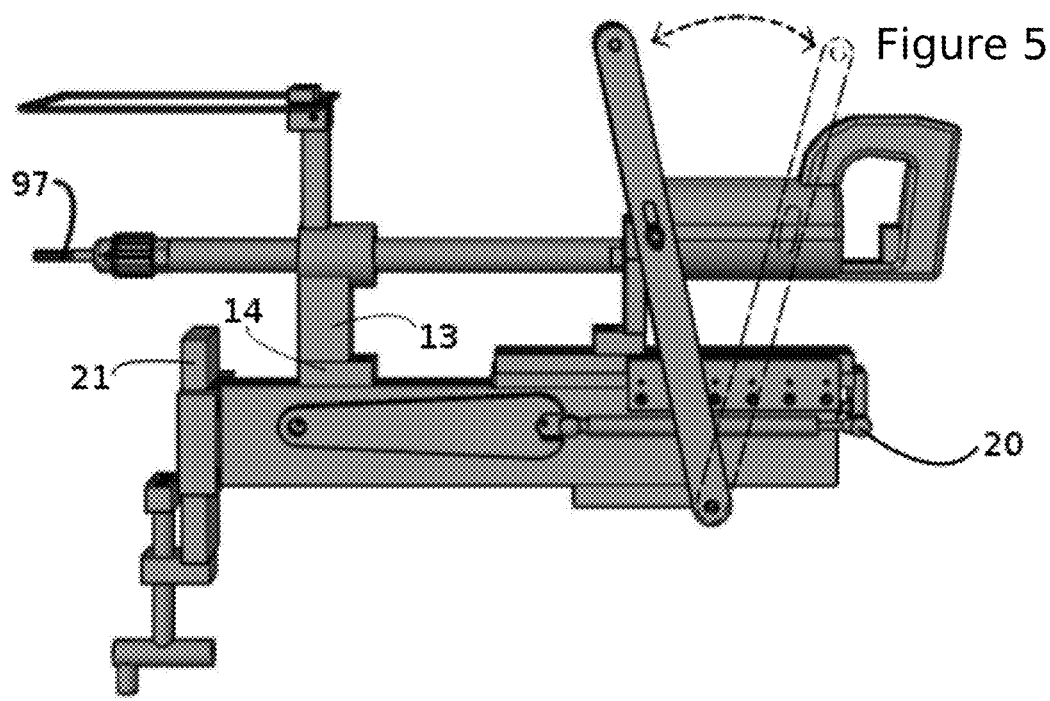

Reference is now made to FIGS. 3 and 4 to explain the workpiece conveyance module. In this module, the X-lead screw 30 is held in place but may rotate by a support mount 24 acting as a pillow block for the spinning screw 30. The rotation of the X-lead screw 30 by means of a lead-screw handle 28 conveys the entire workpiece retention module along the extension of the X-lead screw 30: the relative X-axis of the machine. To lock the X-coordinate movement, the workpiece retention module may be clamped to the workpiece conveyance module by a bolt extending through the X-degree table 34 into T-nuts 15 within a channel of the Y-body 26, thereby clamping the X-degree table 34 in place. The Y-lead screw 27 is held in place but allowed to rotate by a Y-pillow block 23, and the rotation of the Y-lead screw 27 either raises or lowers the Y-body 26, thereby conveying the workpiece retention module as well as the rest of the workpiece conveyance module along the machine's relative Y-axis. The Y-pillow-block 23 is held in place by the Y-riser 21 which is fastened to the main body 18 of cutting instrument module.

Figure 6:
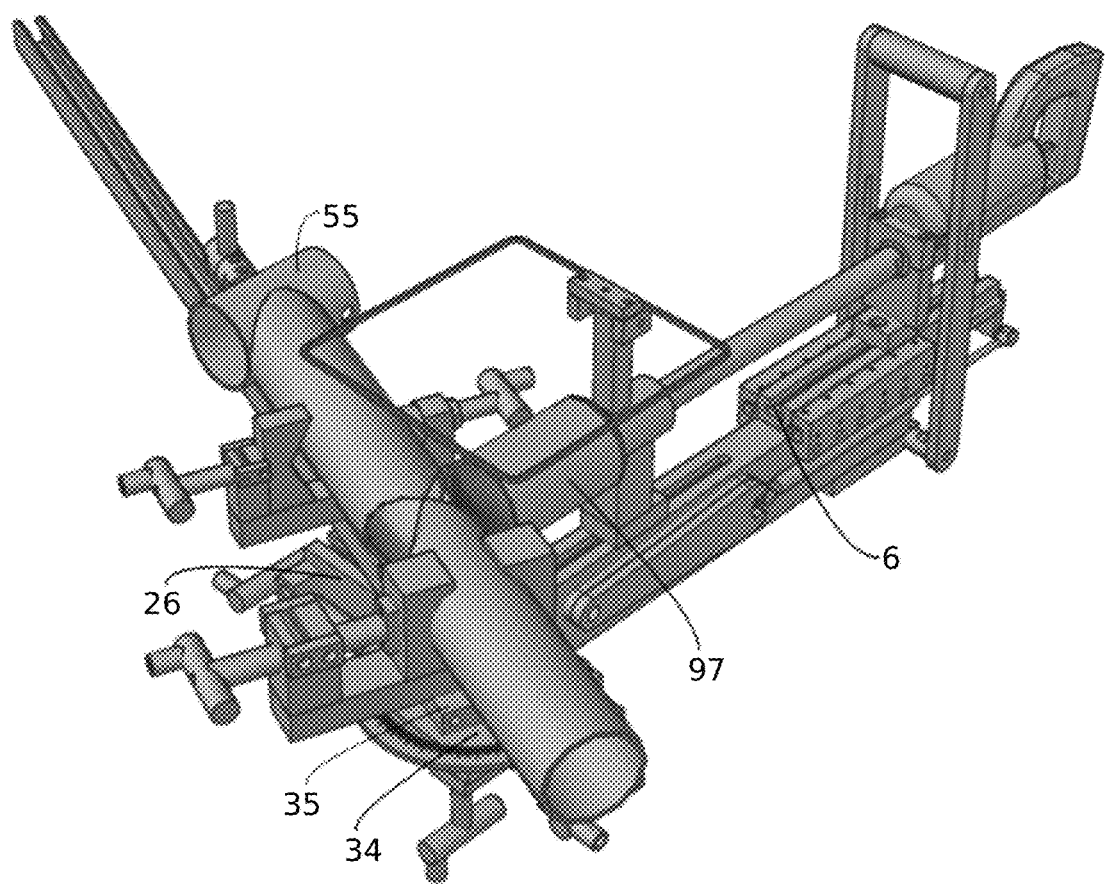
FIG. 6 is an isometric view that shows a tube being cut at a non-90° angle. In this view, one can see that the work-stop 55 may be angled so that angled work-pieces can be butted against it solidly.

Reference is now made to FIGS. SA and SB as well as FIG. 6 in order to explain the main body 18 as well as the rest of the quill or cutting instrument module. The main body 18 supports the quill module through two main structures. For the first structure, the drive motor support structure, a slide block 6 connects to the main body 18 through two slide guides 7. A drive motor clamp base 1 resides within and travels along a channel in the slide block 6, and supports the drive motor clamp 2. Finally, the drive motor clamp 2 attaches to the shaft 11 of the cutting instrument 97 near to the drive motor 162. For the second structure, nearer the cutting instrument 97, at the opposite end from the drive motor 162, the shaft 11 is supported through the shaft guide 12, shaft guide spacer 13, and the shaft guide mount 14, which rests upon the main body 18. The shaft guide 12 has apertures that can accommodate different job-specific accessories, such as safety shields 103.

These support structures hold the cutting instrument 97 within the cutting plane, even during cutting, drilling, and light machining actions. As for the quill, the rotational power of the drive motor 162 is imparted upon the cutting instrument 97 through the shaft 11. In alternative embodiments, rotation can be applied directly to the shaft 11 in a number of ways, and the shaft may be shaped, scored, or otherwise equipped to accommodate these alternative power sources. In addition to rotation about the Z-axis, this shaft 11 can be moved along the Z-axis within these supports, thereby moving the cutting instrument 97 through the cutting path. A feed handle 5 attaches to two feed bars 3 which connect to the drive motor 162. The feed bars 3 are attached to the main body 18 through the feed adjuster 17. The feed adjuster 17 allows the operator to move the fulcrum of this lever to adjust his or her mechanical advantage and travel speed when cutting. In conjunction with the feed adjuster 17, a threaded stop rod 60 is housed within the main body 18 and may be rotated to bring it into place to act as a stop for the Z-coordinate cutting path of the cutting agent 97.

An alternative embodiment of the present invention involves using the assembly in the secondary mode of operation, where the stand mount 47 is removed from the main body 18 and the assembly, sans stand, is affixed to a stationary workpiece 50 as its manner of support. The assembly still comprises three modules in this alternative embodiment, but the rotation of the workpiece retention module and the movement of the workpiece conveyance module would move the cutting agent relative to the stationary workpiece, instead of the other way around.

In addition to the specifications of the preferred embodiment and alternative embodiments of the present invention included herein, I wish to include those obvious modifications that may appear to those skilled in the art under the protection of this patent application.

I claim:

1. An improved notching system for tubular workpieces, of the type comprising a circular cutting tool having a centerline and a source of rotational power, a main body supporting and guiding the circular cutting tool in a straight line toward a tubular workpiece, this tubular workpiece having its own centerline, wherein the improvement comprises:

a. a substantially linear work support rail operatively connected to the main body and supporting and aligning the centerline of the tubular workpiece with the centerline of the circular cutting tool, this work support rail having:
1. a front end slidably supporting a close quarters vise with two jaws, which clamps a corresponding front section of the tubular workpiece;
2. a center section, downstream from the front end, slidably supporting a cutoff support vise with two jaws, which clamps a corresponding center section of the tubular workpiece;
3. a tail end, downstream from the center section, slidably supporting an indexable work stop, against which butts a corresponding tail section of the tubular workpiece;
4. means for vertically moving the support rail relative to the centerline of the circular cutting tool;
5. means for horizontally moving the support rail relative to the centerline of the circular cutting tool;
6. means for rotating the support rail relative to the centerline of the circular cutting tool;

b. a feed handle affixed beneath and supporting the main body; and
c. a stand mount connecting the main body to a work support.

2. The improved notching system for tubular workpieces as in claim 1, wherein the close quarters vise further comprises a vise insert selectively attached to a tubular workpiece-facing surface of each of its two jaws.

3. The improved notching system for tubular workpieces as in claim 1, wherein the work support comprises a floor stand.

4. The improved notching system for tubular workpieces as in claim 3, wherein the floor stand further comprises a leveling stand.

5. The improved notching system for tubular workpieces as in claim 1, wherein the work support comprises a vehicle.

6. The improved notching system for tubular workpieces as in claim 1, wherein the work support is vertical relative to the ground.

7. The improved notching system for tubular workpieces as in claim 6, wherein the vertical work support is selected from the group consisting of pole and post.

8. The improved notching system for tubular workpieces as in claim 1, wherein the circular cutting tool is selected from the group consisting of hole saw, drill bit, annular cutter, boring head, routing bit, buffing wheel, stropping wheel, coring bit, tap, reamer and end mill.

* * * * *